(12) United States Patent
Narai et al.

(10) Patent No.: US 7,328,864 B2
(45) Date of Patent: Feb. 12, 2008

(54) ELECTRIC GRATING FOOD PROCESSOR AND GRATER PLATE

(75) Inventors: Akira Narai, Matsumoto (JP); Masanori Misawa, Matsumoto (JP)

(73) Assignee: Izumi Products Company, Nagano (JP)

( * ) Notice: Subject to any disclaimer, the term of this patent is extended or adjusted under 35 U.S.C. 154(b) by 0 days.

(21) Appl. No.: 11/588,804

(22) Filed: Oct. 27, 2006

(65) Prior Publication Data

US 2007/0095959 A1    May 3, 2007

(30) Foreign Application Priority Data

Oct. 28, 2005   (JP)   ............... 2005-314236

(51) Int. Cl.
*A47J 43/25*   (2006.01)
(52) U.S. Cl. .................. 241/92; 241/94; 241/273.2
(58) Field of Classification Search .............. 241/92, 241/273.1–273.4, 37, 94, 95
See application file for complete search history.

(56) References Cited

U.S. PATENT DOCUMENTS 3,589,421 A * 6/1971 Locker .................... 241/95
4,877,191 A * 10/1989 Golob et al. ............. 241/92

\* cited by examiner

*Primary Examiner*—Mark Rosenbaum
(74) *Attorney, Agent, or Firm*—William L. Androlia; H. Henry Koda

(57) ABSTRACT

An electric grating food processor including a food material receiving section 18 that has an opening in its upper part and receives processed food materials therein, a cylindrical food material charging section 68 that has a lower end opening at its lower end, a grater plate 58 that is rotated or linearly reciprocated under the lower end opening of the food material charging section, and a drive unit for operating (rotating or linearly reciprocating) the grater plate; and the grater plate is formed with larger grating blades on one surface side thereof and lower grating blades on another surface side thereof, and the grater plate is further provided thereon with a gap adjuster 98 that adjusts the gap between the tip ends of the grating blades and the lower end opening of the food material charging section.

2 Claims, 7 Drawing Sheets

ELECTRIC GRATING FOOD PROCESSOR AND GRATER PLATE

BACKGROUND OF THE INVENTION

1. Field of the Invention

The present invention relates to an electric food processor in which food materials to be processed are supplied from above to a grater plate that moves either rotationally or reciprocally, so that the food materials are subjected to a grating process, and further to a grater plate used in such an electric food processor.

2. Description of the Related Art

Electric food processors in which a grater plate is moved rotationally or reciprocally, so that by pushing vegetables such as radishes against such a running grater plate, the vegetables are sliced, finely minced, and/or grated, are generally known.

In the electric food processor disclosed in Japanese Patent Application Laid-Open (Kokai) No. 55-48600, cutter blades are formed by cutting and raising (bending) on only one surface side of a rotating grater plate. In the apparatus shown in Japanese Utility Model Application Laid-Open (Kokai) No. 61-35143, cutter blades are formed by cutting and raising on both surface sides of a grater plate.

With the electric food processor of Japanese Patent Application Laid-Open (Kokai) No. 55-48600, it is necessary to provide grater plates of differing coarseness in order to meet the changes in the coarseness of the grating blades, making handling of the apparatus a bother. With the food processor of Japanese Utility Model Application Laid-Open (Kokai) No. 61-35143, because the grating blades of differing coarseness are formed on both front and back surface sides of the grater plate, it can be said that the number of grater plates provided is fewer compared to the device of Japanese Patent Application Laid-Open (Kokai) No. 55-48600.

In conventional electric food processors, however, the gap between the lower end opening of a food material charging section and the grater plate is fixed. Accordingly, when the coarseness of the grating blades on the front and back sides differs (in other words, when the height of the grating blades on the front and back sides differs), the gap between the grating blade tip ends and the lower end opening of the food material charging section will vary with respect to the front and back sides of the grater plate. In such cases, particularly when using fine grating blades (that is, small grating blades the cutter blade height thereof is low), the gap between the tip ends of the grating blades and the lower end opening of the food material charging section becomes excessive, so that unprocessed (or ungrated) food materials will escape from the gap in the final stage of grating processing. As a result, problems arise. The unprocessed food materials get mixed in with the processed grated food materials, and as a result, the quality of the completely processed grated food materials becomes non-homogenous.

BRIEF SUMMARY OF THE INVENTION

The present invention is devised in view of the circumstances described above.

It is a first object of the present invention to provide an electric grating food processor in which, even when a grater plate having grating blades of different coarseness on the front and back sides is used, unprocessed (or ungrated) food materials are prevented from getting mixed into the finished grated food materials, so that the quality of the processed grated food materials is kept uniform.

It is a second object of the present invention to provide a grater plate for use in food processors.

The above-described first object is accomplished by a unique structure of the present invention for an electric grating food processor that includes:

a food material receiving section having an opening in its upper part and receiving processed food materials therein;

a substantially cylindrical food material charging section having at its lower end a lower end opening;

a grater plate operated (rotated or reciprocated) under the lower end opening of the food material charging section;

a drive unit for operating (rotating or reciprocating) the grater plate by an electric motor; and in this structure:

the grater plate is provided with first grating blades on one surface side thereof and second grating blades on another surface side thereof with the first grating blades greater in height than the second grating blades; and the grater plate is further provided thereon with a gap adjuster that adjusts a gap between the tip ends of the grating blades and the lower end opening at the lower end of the food material charging section to be consistent.

The above-described second object is accomplished by a unique structure of the present invention for a grater plate that comprises: a metal plate formed therein with a plurality of openings, and first and second grating blades formed by being bent and raised along edges of the openings; wherein the first grating blades protrude on one surface side of the grater plate and the second grating blades protrude on another surface side of the grater plate, with the first grating blades being greater than the second grating blades in height.

In the electric grating food processor of the present invention, the gap between the tip ends of the grating blades of the grater plate and the lower end opening (opening edges) of the food material charging section is made so as to be adjustable by a gap adjuster. Accordingly, by suitably setting the gap according to the height level of the grating blades, it is possible to prevent food materials charged through the food material charging section from being dragged by the grating blades of the grater plate from the gap between the lower end opening (opening edges) of the food material charging section and the grater plate and being scattered in the unprocessed (or ungrated) condition to the periphery. Accordingly, unprocessed food materials are prevented from mixing in with the finished grated food materials, and the quality of the processed food materials can be made uniform.

In the above-described structure, the gap adjuster can be designed so that it adjusts the height level (horizontal position) of the grater plate so that the gap (gap) formed by the large grating blades and the lower end opening of the food material charging section and the gap (gap) formed by the small grating blades and the lower end opening of the food material charging section is equal.

In the food processor of the present invention, the food processor can be designed so that it causes a circular grater plate to rotate (to make a rotational electric grating food processor). In such a rotational electric grating food processor, the grater plate is removable (so as to be attached to, detached from, and exchanged) on the vertical grater plate attachment shaft from above, and the gap adjuster is formed by a height adjustment spacer which is provided on one surface side of the grater plate where the large grating blades are formed and which surrounds the attachment hole formed in the grater plate and fitted on the grater plate attachment shaft.

In the present invention, the food processor can be one that causes a grater plate to move linearly reciprocally (to make a reciprocating type electric grating food processor). In such a reciprocating type electric grating food processor, the grater plate is held so that it can be attached, detached, and exchanged, in a reciprocating member that reciprocally moves in the direction of a longer side of a substantially box-shaped food material receiving section. In addition, a gap adjuster is formed by a height adjustment spacer, so that the spacer, when the grater plate is held in the reciprocating member with one surface side on which the large grating blades are formed facing downward, sets the other surface side of the grater plate (on which the small grating blades are formed) to be positioned at substantially the same height level as the one surface side (on which the large grating blades are formed).

The grater plate of the present invention is formed with a plurality of openings penetrating through the thickness of the grater plate; and along the inner edges of these openings, the large grating blades are bent and raised on one surface side of the grater plate, and the small grating blades are bent and raised on the other surface side of the grater plate. In this grater plate, when the grating blades on one surface thereof is used, the grating blades protruding on the other surface side do not protrude from the surface of the grater plate; as a result, the processed food materials adhering to the surface of the grater plate readily drop into the food material receiving section from the edges of the openings where grating blades are not protruding. Accordingly, the food processor is convenient for continuously carrying on the processing smoothly.

The openings formed in the grater plate can be made substantially rectangular (and can be square also) when viewed from above, and grating blades are bent and raised along two opposing side edges of each of the openings, such side edges crossing at right angles in the direction of the movement (rotating or linearly reciprocating motion) of the grater plate. It is preferable that the grating blades formed on the respective side edges of each opening of the grater plate be made so that the movement tracks drawn by the respective grating blades differ from side each other or not to overlap (In other words, it is preferable that the movement (rotating, for instance) tracks drawn by the tip ends pf the grating blades formed along one side edge of an opening be different from the movement (rotating) tracks drawn by the tip ends of the grating blades formed along the opposing side edge of the opening). With this setting of the grating blades, the grating blades on the same surface grate-process the different portions of the food materials.

In the grater plate of the present invention, the grating blades are bent and raised along the edges each of the plurality of openings; however, processability of the grater plate is better if the large grating blades and the small grating blades are formed at different openings. The reason therefor is that, by press- or sheer- processing grating blades that protrude to the inside of the openings, and by bending (drawing) the grating blades provided at the openings using a die that advances into the openings, the grating blades can be formed to protrude on one surface side easily.

In the grater plate of the present invention for a rotational type electric grating food processor, the openings in a round type grating plate are shaped substantially rectangular, with longer sides of the openings set in the radial direction of the grating plate, and the grating blades are formed along the longer sides of the openings. In the grater plate of the present invention for a reciprocal type electric grating food processor, the openings are shaped substantially rectangular in the substantially rectangular grater plate with longer side of the openings set in a direction crossing the direction of grater plate reciprocating motion, and the grating blades are formed along the longer sides of these openings.

BRIEF DESCRIPTION OF THE SEVERAL VIEWS OF THE DRAWINGS

FIGS. 7(A), 7(B) and 7(C) show a grater plate in which FIG. 7(A) shows the first side thereof with the large grating blades are provided thereon, 7(B) is a side view thereof, and 7(C) is a second side thereof with the small grating blades provided thereon.

DETAILED DESCRIPTION OF THE INVENTION

Figure 1:
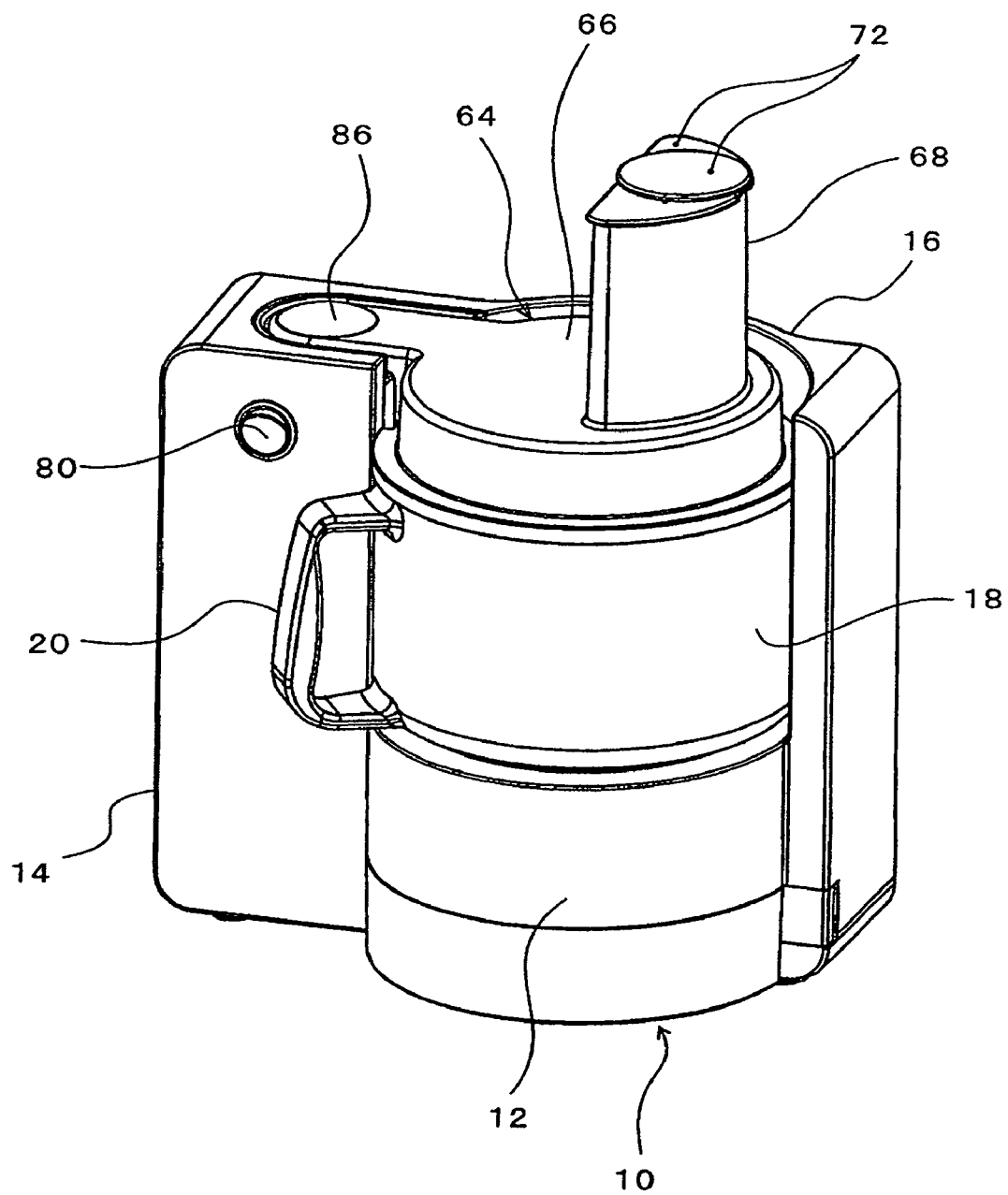
FIG. 1 is a perspective view of an electric grating food processor according to one embodiment of the present invention.
Figure 2:
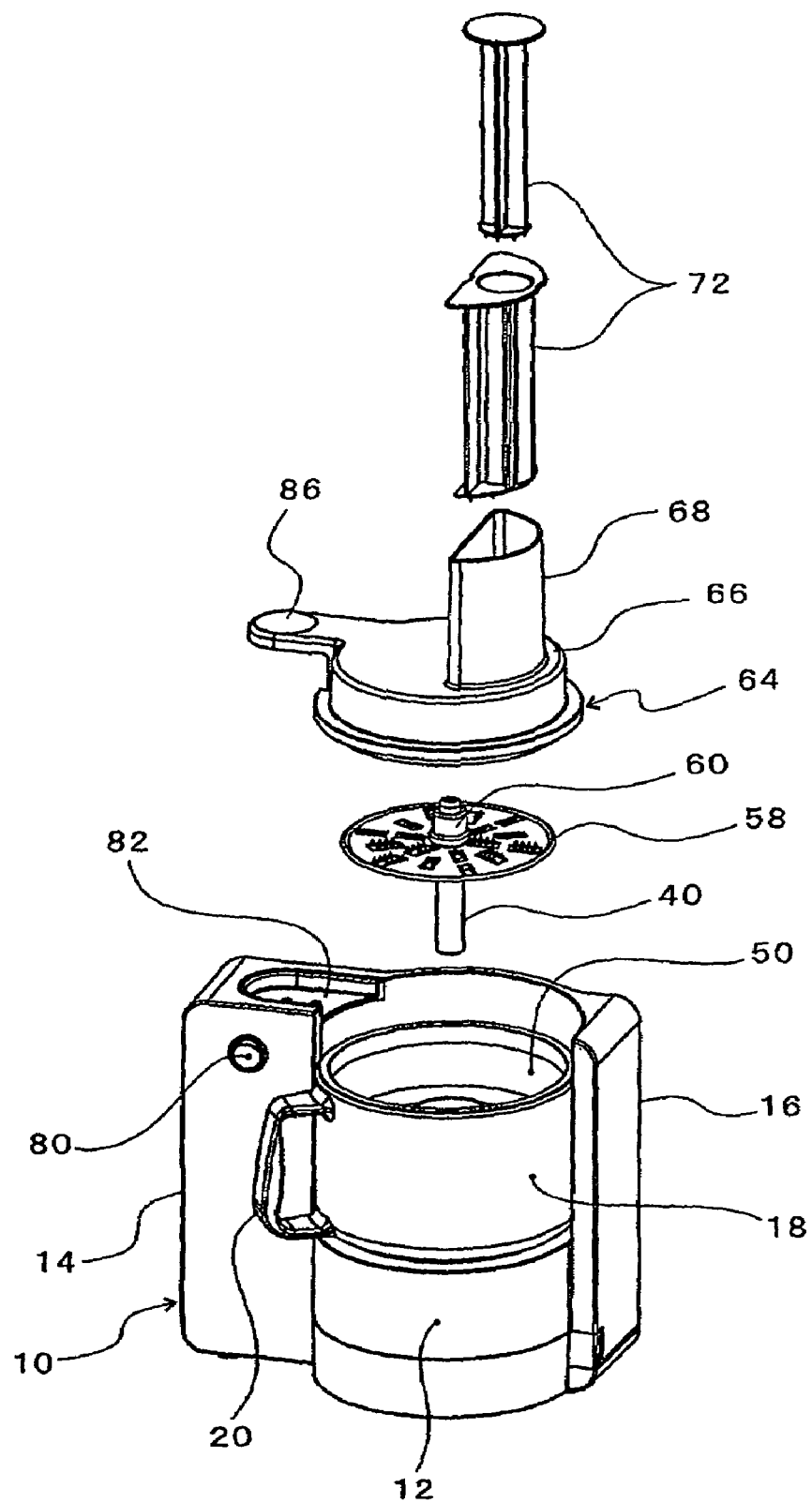
FIG. 2 is a partially exploded perspective view thereof.
Figure 3:
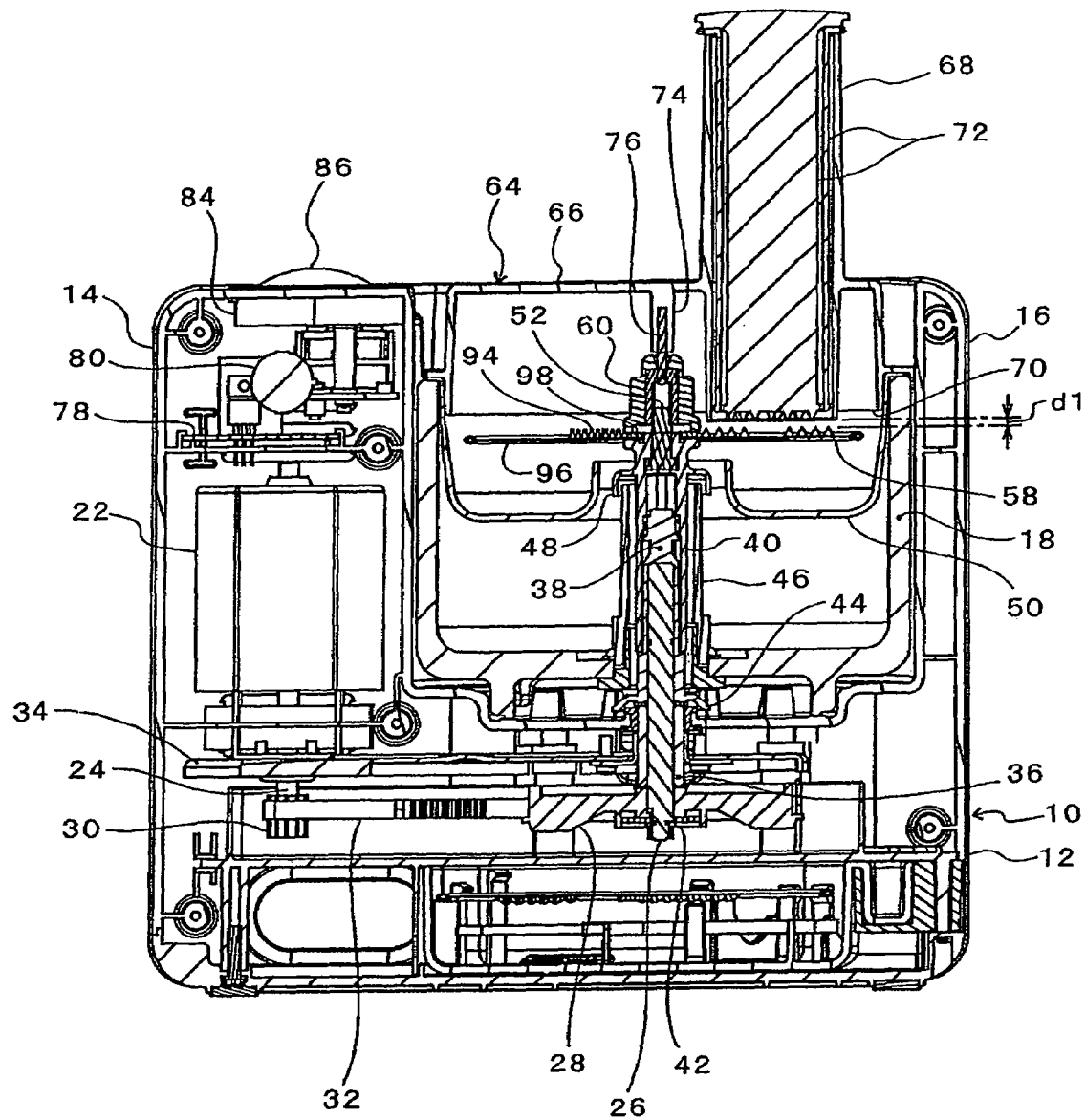
FIG. 3 shows a vertical cross-section of the electric grating food processor in which the large grating blades are used.
Figure 4:
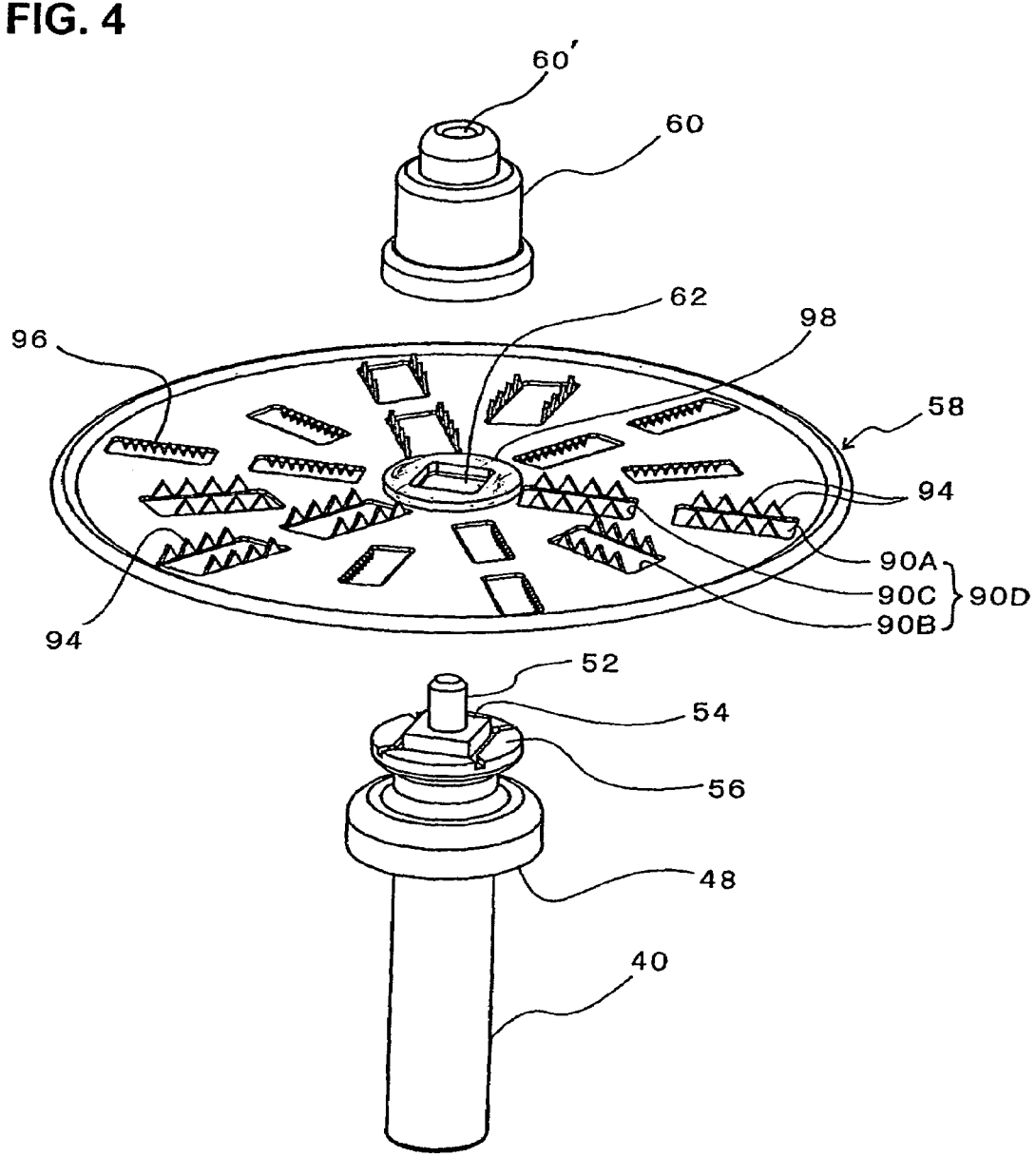
FIG. 4 illustrates the manner of attaching a grater plate having the large grating blades to the grater plate attachment shaft.
Figure 5:
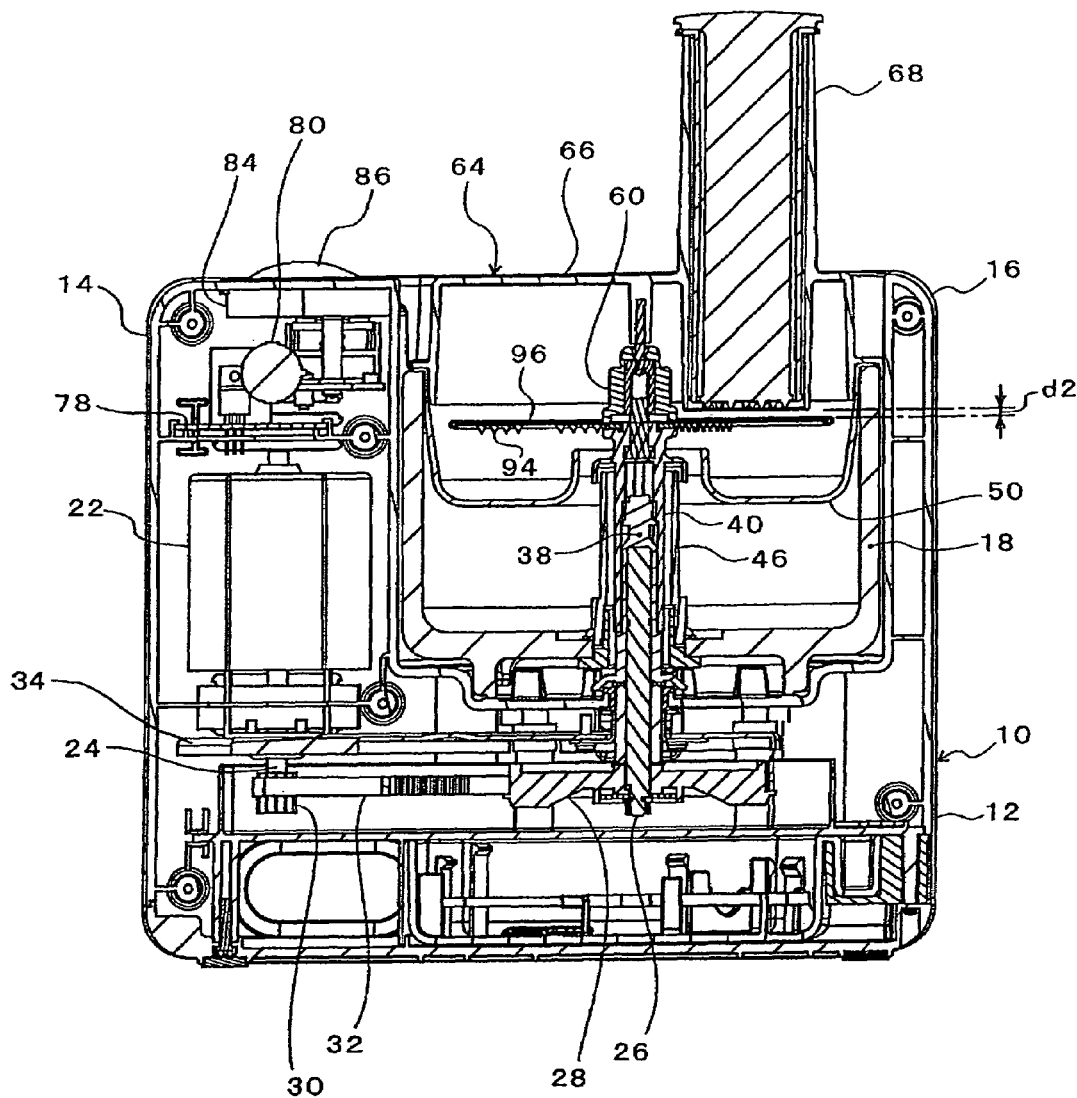
FIG. 5 shows a vertical cross-section of the electric grating food processor in which the small grating blades are used.
Figure 6:
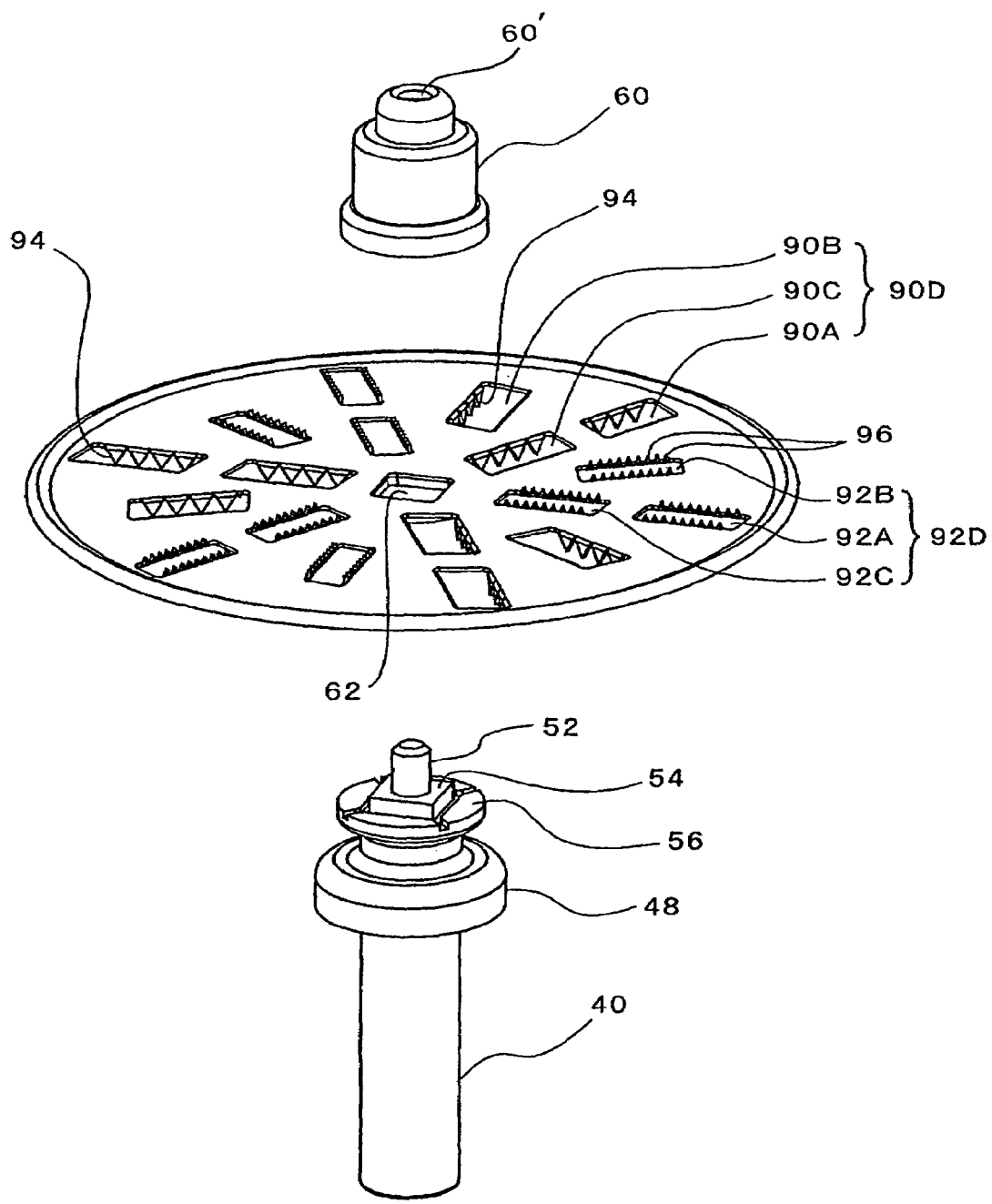
FIG. 6 illustrates the manner of attaching a grater plate having the small grating blades to grater plate attachment shaft.

FIG. 1 is a perspective view of a rotational type electric grating food processor according to one embodiment of the present invention, FIG. 2 is a partially exploded perspective view thereof, FIG. 3 shows in cross-section how the large grating blades are used, FIG. 4 is a perspective view showing the manner of attaching the grater plate to a grater plate attachment shaft with the large grating blades upward, FIG. 5 shows in cross-section how the small grating blades are used, FIG. 6 is a perspective view showing the manner of attaching the grater plate to a grater plate attachment shaft with the small grating blades upward, and FIG. 7 is a set of diagrams for a grater plate.

In FIGS. 1 to 3 and 5, the reference numeral 10 designates a food processor main unit; and it includes a platform 12 that is substantially circular when viewed from above, a rectangular column 14 rising upward from outside (the left side when viewed from the front or in FIG. 1) the platform 12, and an outer wall unit 16 rising upward from outside the platform 12. This outer wall unit 16 is continuous in the circumferential direction with the rectangular column 14, and it encloses approximately half of the circumference of the platform 12 on the back side thereof. With this outer wall unit 16, a substantially cylindrical space is formed above the platform 12, enclosed by the rectangular column 14 and the outer wall unit 16 but open on the front side, so that a cup 18, circular when viewed from above, is accommodated from above in this substantially cylindrical space. The cup 18 constitutes the food material receiving section of the present invention. A handle 20 for the cup 18 protrudes to the front from between the rectangular column 14 and outer wall unit 16 of the food processor main unit 10.

Inside the rectangular column 14, as seen from FIG. 3, an electric motor 22 is housed, with the turning shaft 24 thereof oriented vertically downward. In the platform 12, a turning shaft 26 is attached which penetrates vertically through the upper surface of the platform 12. At the lower end of the turning shaft 26, a pulley 28 of large diameter is secured. To the turning shaft 24 of the motor 22, a pulley 30 of small diameter is secured. In addition, a rubber belt 32 is mounted on the pulleys 28 and 30, so that the turning shaft 26 is rotationally driven by the motor 22.

A structure that installs the turning shaft 26 will be described with reference to FIGS. 3 and 5.

Inside the platform 12 and rectangular column 14, a support plate 34 is provided horizontal by suitable rubber dampers. The motor 22 is attached to the support plate 34 by rubber dampers, and the turning shaft 24 thereof penetrates downward through the support plate 34. A cylindrical slide bearing 36 for holding the turning shaft 26 penetrates through the support plate 34 and the upper surface of the platform 12 and is secured to the support plate 34.

The turning shaft 26 penetrates through the slide bearing 36 from below; and, into the protruding portion of the upper part thereof, a column-shaped locking member 38 is pressure-inserted and secured from above. To the locking member 38, a cylindrical grater plate attachment shaft 40 is detachably attached. The upper end of the locking member 38 engages a channel formed in the axial direction in the inner circumferential surface of the upper part of the grater plate attachment shaft 40 and transmits turning, while the outer circumferential surface of the intermediate portion of the locking member 38 mates with the inner surface of the lower part of the grater plate attachment shaft 40, so that axial wobble in the grater plate attachment shaft 40 is prevented.

When actually putting the turning shaft 26 together, after first pressure-inserting and securing the locking member 38 to the turning shaft 26, the turning shaft 26 is passed from above through the slide bearing 36. Then, after mounting the pulley 28 to the lower end of the turning shaft 26, a retaining ring (circlip) 42 is attached to the turning shaft 26 to prevent the pulley 28 from falling off. At the lower end of the locking member 38, moreover, an eave-shaped water guard 44 is formed which covers the vicinity of the upper end of the slide bearing 36 from above. To the upper end of the grater plate attachment shaft 40, a grater plate 58, described below, can be attached.

The bottom of the cup 18 can be positionally set in the center of the upper surface of the platform 12. In the cup 18, a cylindrical member 46 is secured so as to be watertight, penetrating through the center of the bottom thereof and extending upward. With the above-described grater plate attachment shaft 40 removed, the cup 18 is set in the center of the upper surface of the platform 12 while positioning the cylindrical member 46 at the locking member 38. Then the grater plate attachment shaft 40 is attached so that the grater plate attachment shaft 40 is covered from above by the locking member 38. In the grater plate attachment shaft 40, an eave-shaped water guard 48 is formed which covers the opening in the upper end of the cylindrical member 46 from above.

To the upper edge of the cup 18A, an auxiliary food material receiving section 50 is fastened. This auxiliary food material receiving section 50 encloses at its center the outer circumference of the water guard 48 and has a ring-shape depression so that it receive grating-processed food materials. The auxiliary food material receiving section 50 is used when the grating-processing quantity is small.

At the upper end surface of the grater plate attachment shaft 40, as shown in FIGS. 4 and 6, an screw 52 that is inserted protrudes out vertically; and a square projection 54, which encloses the screw 52, and a horizontal surface 56, which is positioned on the outside of the projection 54, are formed. By placing the grater plate 58 on the horizontal surface 56, and screwing and tightening a locking nut 60 onto the screw 52 from above, the grater plate 58 is secured to the grater plate attachment shaft 40. In the grater plate 58, a square engagement hole 62 is formed at a center thereof for engaging the square projection 54 of the grater plate attachment shaft 40, so that the grater plate 58 and the grater plate attachment shaft 40 turn as one without slipping in between.

In FIGS. 1 to 3 and 5, the reference numeral 64 is a cover. This cover 64, as is clear from FIG. 2, has a lid 66, which engages the upper edge of the cup 18, and a cylindrical food material charging section 68, which penetrates through a position away from the center of the lid 66, in the up-and-down direction. This food material charging section 68 has a passageway, which is crescent-shaped when viewed from above, and has a lower end opening 70, which faces the grater plate 58 proximately.

Into the food material charging section 68, a food material pressing member 72 is insertable from above. This food material pressing member 72 has a double-insert structure, resulting in a triple-insert structure with the food material charging section 68. When the lower end of the food material pressing member 72 reaches the vicinity of the lower end opening 70 of the food material charging section 68, the upper end of the food material pressing member 72 engages the edge of the upper end opening of the food material charging section 68 and stops at the position shown in FIGS. 3 and 5.

As seen from FIG. 3, in the center of the inner surface of the lid 66, a projection 74 is provided which is oriented downward, and a supporting rod 76 is inserted in the projection 74. This supporting rod 76 engages an engagement recess 60' provided in the locking nut 60 on the grater plate attachment shaft 40 side when the lid 66 covers the cup 18, preventing axial wobble in the grater plate attachment shaft 40.

In the upper part inside the rectangular column 14 of the food processor main unit 10, a circuit board 78 is installed (see FIGS. 3 and 5), and a main switch 80 is attached on the front side of the rectangular column 14. In the upper surface of the rectangular column 14, a concavity 82 is formed which opens above and toward the lid 66 side. An activating switch 84 (see FIGS. 3 and 5) is located in the concavity 82.

In the cover 64, a tongue-shaped part 86 is integrally formed which is continuous with the lid 66 and advances inside the concavity 82. This tongue-shaped part 86, as shown in FIG. 1, enters the concavity 82 when the cover 64 is attached. The activating switch 84 is turned on when the tongue-shaped part 86 is depressed from above. When the tongue-shaped part 86 is depressed, if the main switch 80 has been turned on, then the motor 22 starts running.

Next, the grater plate 58 will be described.

Figure 7A:
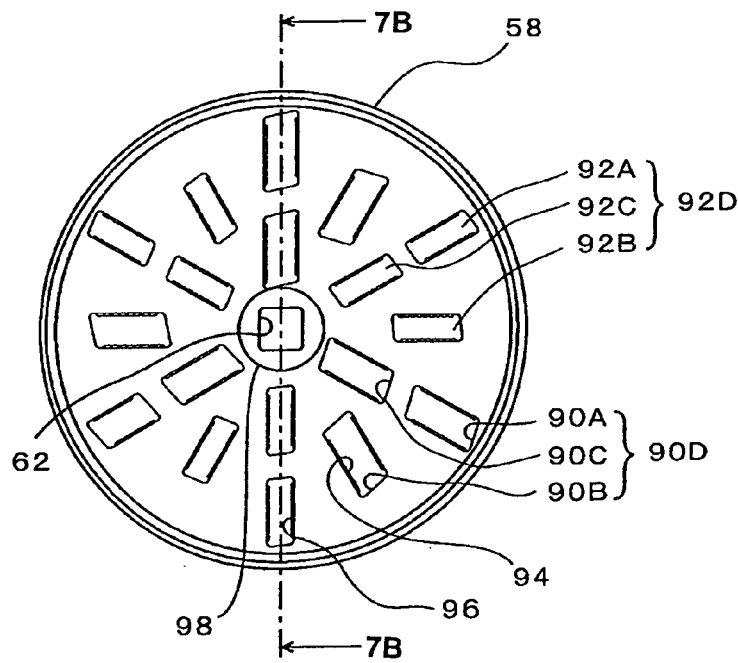
Figure 7B:
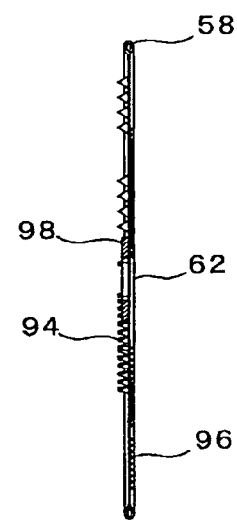
Figure 7C:
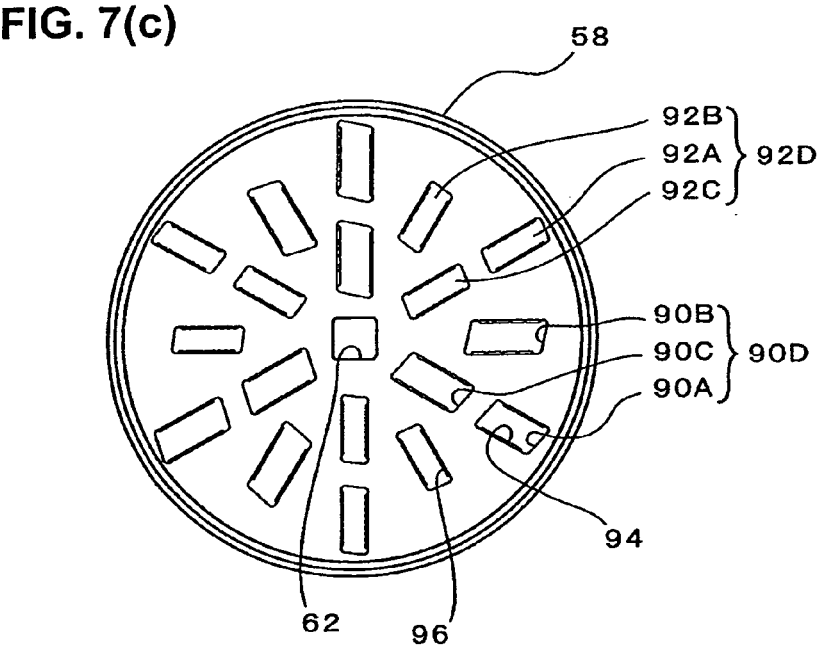

The grater plate 58 of the shown embodiment is a circular metal plate and has a plurality of substantially rectangular (quadrangular) openings 90 (90A to 90C) and 92 (92A to 92C) formed therein so that they penetrate through the thickness of the grater plate. Large grating blades 94 and small grating blades 96 are formed by, respectively, being bent and raised along the opening edges of these openings 90 and 92. FIG. 7(A) shows one surface side of the grater plate on which the large grating blades (first blades) 94 are formed, and FIG. 7(B) shows the cross section taken along at the line 7B-7B in FIG. 7(A), and FIG. 7(C) shows another surface side of grater plate 58 on which the small grating blades (second blades) are formed. The openings 90 and 92 can be square in shape.

The openings 90 are formed in three groups at equal gaps about the center of the grater plate 58, each group comprising three openings 90A, 90B, and 90C, wherein large grating blades are formed, in group 90D. On the other hand, the openings 92 are formed in three groups, namely the groups 92D; and they are provided between the groups 90D comprising the openings 90A, 90B, and 90C, with each one of three groups 92D comprising three openings 92A, 92B, and 92C, wherein small grating blades 96 are formed. The three openings 90A to 90C and the three openings 92A to 92C forming the groups 90D and 92D, respectively, are substantially rectangular (quadrangular), and the longer sides of each one of the rectangular openings are set in the radial direction from the center of the grater plate 58, and three openings of each group of the openings are displaced in the circumferential direction of the grater plate 58, so that the distances of the three opening are different from the center of the grater plate 58.

Along the loner side edges of each one of the openings 90A to 90C, large grating blades 94 are bent and raised, on one (first) side surface of the grater plate 58. More specifically, along the two opposing longer side edges of each one of the openings 90A, 90B and 90C, parallel in the radial direction of the grater plate 58, are formed with the large grating blades 94 so that they are substantially in parallel in the radial direction of the grater plate 58. Likewise, along the loner side edges of each one of the openings 92A to 92C, small grating blades 96 are bent and raised, on another (second) side surface of the grater plate 58. More specifically, along the two opposing longer side edges of each one of the openings 92A, 92B and 92C, parallel in the radial direction of the grater plate 58, are formed with the small grating blades 96 so that they are substantially in parallel in the radial direction of the grater plate 58.

These large and small grating blades 94 and 96 (the grating blades 64 being greater in height than the grating blades 96) are punched out in triangular projection shapes when the openings 90 and 92 are press-punched (sheared), and these triangular projections are bent (drawn) at substantially right angles by advancing a die into the openings 90 and 92 from the surface opposite the surface on which the grating blades 94 and 96 are respectively formed.

Furthermore, the grating blades 94 formed along the opposing longer side edges in the same openings 90 are made so that the turning tracks thereof do not overlap in the radial direction. Likewise, the grating blades 96 formed along the opposing longer side edges in the same openings 92 are made so that the turning tracks thereof do not overlap in the radial direction. In arranging the grating blades 94 and 96 so that the turning tracks thereof do not overlap in the radial direction, the openings 90 and 92 are formed with the opposing longer side edges slightly offset in the radial direction (offset by the measure of, for instance, half the pitch of the grating blades 94 and 96), thus being substantially parallelogram shapes.

In the center of this grater plate 58, the square engagement hole 62 into which the square projection 54 of the above-described grater plate attachment shaft 40 engages is formed; and, on one (first) surface side thereof, that is, on the surface side on which the large grating blades 94 protrude, a spacer 98, of a prescribed thickness, is welded, enclosing the engagement hole 62. The thickness of the spacer 98 is set so that, when the grater plate 58 is mounted on the grater plate attachment shaft 40, the gaps d1 and d2 (FIGS. 3 and 5) between the tip ends of the grating blades 94 and 96 and the lower end opening 70 of the food material charging section 68 become substantially equal. In other words, the height of the spacer 98 is substantially equal to the difference in height of the grating blades 94 and 96. The spacer 98 constitutes the gap adjuster of the present invention.

The manner of operation of the food processor described above will be provided below.

First, the cover 64, the grater plate attachment shaft 40 together with the grater plate 58, the auxiliary food material receiving section 50, and the cup 18 are removed.

When the large grating blades 96 of the grater plate 58 are to be used, the grater plate 58 is placed on the grater plate attachment shaft 40 with the surface having the large grating blades 96 facing upward and with square engagement hole 62 of the grater plate 58 fitted on the square projection 54 so that the grater plate 58 sits on the horizontal surface 56, and then the locking nut 60 is tightened, thus setting the grater plate 58 on the grater plate attachment shaft 40 (see FIGS. 3 and 4).

Next the cup 18 and, when necessary, the auxiliary food material receiving section 50 are placed on the platform 12. When this is done, the locking member 38 made integral with the turning shaft 26 advances into the cylindrical member 46 on the cup 18 side. The grater plate attachment shaft 40 having the grater plate 58 is inserted into the cylindrical member 46 from above, and the grater plate attachment shaft 40 is mated with the locking member 38 and secured. Next, when the cover 64 is set in place, the supporting rod 76 on the inner surface thereof engages in the locking nut 60, more specifically in the engaging recess 60' of the locking nut 60.

In that condition, the lower end opening 70 of the food material charging section 68 forms the gap d1 between it self (the lower end opening 70) and the tip ends of the large grating blades 94 of the grater plate 58. When the main switch 80 is turned on, and the tongue-shaped part 86 integral with the cover 64 is pressed to turn the activating switch 84 on, the motor 22 starts running. The rotation of the turning shaft 24 of the motor 22 is transmitted through the pinion 30, belt 32, and large pulley 28 to the turning shaft 26; and as a result, the grater plate attachment shaft 40, which is secured to the turning shaft 26, and the grater plate 58 are rotated.

The food material pressing member 72 is pulled out from the food material charging section 68, and food materials such as radishes are charged into the food material charging section 68. Then, the food material pressing member 72 is inserted into the food material charging section 68, and the food materials are pressed against the grater plate 58, so that the food materials are cut and grating-processed by the rotating grater plate 58. Grating-processed food materials thereupon fall from the openings 90 where the large grating blades 94 are formed. Also, grating-processed food materials sticking to the front surface of the grater plate 58 fall from the openings 92 where the small grating blades 96 are formed. In particular, the edges (or blades 96) along the openings 92 do not protrude to the upper surface of the grater plate 58, the food materials fall smoothly through these openings 92.

The dropped grated food materials are collected in the auxiliary food material receiving section 50, or, when the auxiliary food material receiving section 50 is not being used, collected in the cup 18.

When the small grating blades 96 of the grater plate 58 are to be used, the grater plate 58 is removed and turned upside down and then attached back to the grater plate attachment shaft 40. When that is done, the spacer 98 secured to the grater plate 58 comes in contact with the horizontal surface 56 of the grater plate attachment shaft 40 (see FIGS. 5 and 6). The height of the small grating blades 96 protruding to the upper surface of the turned grater plate 58 is smaller than the cutter blade height of the large grating blades 94, but the spacer 98 increases the height of the upper surface of the grater plate 58; accordingly, the gap d2 between the cutter blade tip ends of the small grating blades 96 and the lower end opening 70 of the food material charging section 68 will not become excessive and in fact is substantially equal to the gap d1 that is formed when the grater plate 58 is set with the large grating blades 94 facing upward. Accordingly, unprocessed (or ungrated) food materials will not scatter and fall from the gap d2.

Even with the above structure, food materials readily might clog up the grating blades 94 and 96. Accordingly, it is preferable that the gaps between the grating blades 94 and 96 themselves aligned at opposing sides of the openings 90 and 92 be separated at appropriate distance, or that valleys formed between the grating blades 94 and valleys formed between the grating blades 96 themselves be opened to the other surface of the grater plate 5

In the above description, the food processor is a rotary type, and it contains the grater plate 58 that is round and is rotated to process or grate the food materials. However, the present invention is applicable to a food processor having a reciprocating member that makes reciprocating motion under the lower end opening of the food material charging section.

In such a reciprocating type food processor, the food material receiving section (18) is substantially box-shaped with its upper part opened in a substantially rectangular shape; the drive unit includes a reciprocating member that is reciprocally moved in the direction of the longer side of the food material receiving section (18) by an electric motor; the grater plate is a substantially rectangular shape and is removably held on the reciprocating member so that it can be attached, detached, and exchanged; and a gap adjuster comprised of a height adjustment spacer is provided on the grater plate, so that, when the grater plate is held by the reciprocating member with its first surface side having the large (first) grating blades faced down, the other (second) surface side of the grater plate can be set so that tip ends of the small (second) grating blades thereon takes the same height level as the tip ends of the large (first) grating blades; as a result, the gap between the tip ends of the large and small grating blades and the lower end opening of the food material charging section is always the same.

In the grater plate used in the reciprocating type food processor, the openings of the rectangular grater plate are shaped substantially rectangular with the longer sides being in a direction crossing the direction of the reciprocating motion of the grater plate, and the grating blades are formed along the longer side edges of the rectangular (quadrangular) openings.

The invention claimed is:

1. An electric grating food processor comprising:
a food material receiving section having an opening in an upper part thereof and receiving processed food materials therein;
a substantially cylindrical food material charging section having at a lower end thereof a lower end opening;
a grater plate operated under said lower end opening of said food material charging section;
a drive unit for operating said grater plate; wherein
said grater plate is provided with first grating blades on one surface side thereof and second grating blades on another surface side thereof, said first grating blades greater in height than said second grating blades;
said greater plate is further provided thereon with a gap adjuster that adjusts a gap between tip ends of said grating blades and said lower end opening of said food material charging section;
said food material receiving section is substantially cup-shaped with an upper part thereof opened in a circular shape;
said drive unit has a greater plate attachment shaft that penetrates through a center of said food material receiving section upward from below and is rotatably driven by an electric motor;
said grater plate is removably provided on said grater plate attachment shaft so as to be attached, detached, and exchanged with respect to said grater plate attachment shaft; and
said gap adjuster is comprised of a height adjustment spacer provided on said one surface side of said grater plate on which said first grating blades are formed, said height adjustment spacer enclosing an attachment hole formed in said grater plate and fitted on said grater plate attachment shaft.

2. An electric grating food processor comprising:
a food material receiving section having an opening in an upper part thereof and receiving processed food materials therein;
a substantially cylindrical food material charging section having at a lower end thereof a lower end opening;
a grater plate operated under said lower end opening of said food material charging section;
a drive unit for operating said grater plate; wherein
said grater plate is provided with first grating blades on one surface side thereof and second grating blades on another surface side thereof, said first grating blade greater in height than said second grating blades;
said grater plate is further provided thereon with a gap adjuster that adjusts a gap between tip ends of said grating blades and said lower end opening of said food material charging section;
said food material receiving section is substantially box-shaped with an upper part thereof opened in a substantially rectangular shape;
said drive unit has a reciprocating member that is reciprocally moved in a direction of a longer side of said substantially rectangular upper part of said food material receiving section by an electric motor;
said grater plate is removably held by said reciprocating member so as to be attached, detached, and exchanged with respect to said reciprocating member; and
said gap adjuster is comprised of a height adjustment spacer provided so that, when said grater plate is held by said reciprocating member with said one surface side on which said first grating blades are formed are face down, said another surface side of said grater plate is positioned at substantially same height level as said one surface side.

* * * * *